April 14, 1964    M. V. DADD    3,128,749

ROCKER ARM OIL CONTROL MEANS

Filed Jan. 28, 1963

INVENTOR.
MORRIS V. DADD
BY
*Price & Heneveld*
ATTORNEYS

United States Patent Office 3,128,749
Patented Apr. 14, 1964

3,128,749
ROCKER ARM OIL CONTROL MEANS
Morris V. Dadd, Muskegon, Mich., assignor to Johnson Products, Inc., Muskegon, Mich., a corporation of Michigan
Filed Jan. 28, 1963, Ser. No. 254,064
7 Claims. (Cl. 123—90)

This invention relates to engine lubrication systems generally. Specifically, it relates to means for controlling the flow of lubricating oil from a hydraulic tappet through a hollow push rod to a rocker arm member.

This application is a continuation-in-part of my copending application Serial No. 152,821, filed November 16, 1961, which in turn is an improvement over Patent 2,948,270, issued August 9, 1960, reissued April 10, 1962, as Re. 25,154, and assigned to the assignee of this invention.

The said patent teaches the use of metering means in the form of an apertured partition member interposed between the oil reservoir of the tappet and the entrance of a passageway leading through the rod seat member to the interior of the hollow push rod. In accordance with the teaching of the said patent, the partition member or metering disc has an elevated annular rim portion which abuts the underside of the rod seat in fluid-tight relationship when the tappet assembly is installed in an engine, and a depressed central portion with a raised elongated ridge in contact with the passageway leading through the rod seat member. The apertures in the metering disc for admitting oil from the tappet reservoir are located at points at which the metering disc is spaced from the flat underside of the rod seat member.

Because of the minuteness of the parts and the close tolerances involved (the diameter of the seat is on the order of one-half inch, the thickness of the metering disc is on the order of one one-hundredth of an inch, and the tolerance of the metering canal is on the order of five ten-thousandths of an inch), it was soon found that stamping of the metering discs to the desired shapes while maintaining the necessary tolerances was not economically feasible within the stringent cost requirements of the highly competitive automobile industry.

The present invention solves the problem outlined above by keeping the stamped metering disc flat and instead forming the bottom surface of the push rod seat so as to provide the metering function in cooperation with the flat metering disc. The flat metering disc can easily be held to very close tolerances if good stock is used. In the devices of this invention, the critical three-dimensional configuration is in the central section of the underside of the push rod seat, which is a die-cast part that can be fabricated to close tolerances without excessive difficulty.

It is therefore the object of this invention to provide means for metering lubricating oil from a hydraulic tappet to a hollow push rod in which the metering disc is flat.

This and other objects and advantages of this invention will become apparent from a perusal of the following specification taken in connection with the accompanying drawings in which.

Basically, the invention teaches the use of a cylindrical or other irregular-surfaced nose portion formed on the underside of the push rod seat and arranged to engage a flat apertured metering disc. The nose portion is preferably in the same plane as the rim portion of the undersurface of the push rod seat.

Figure 1:
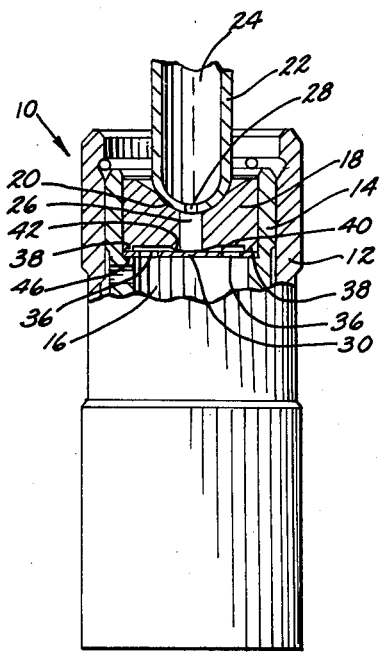
FIG. 1 is a longitudinal section of a valve tappet showing one embodiment of the present invention.
Figure 2:
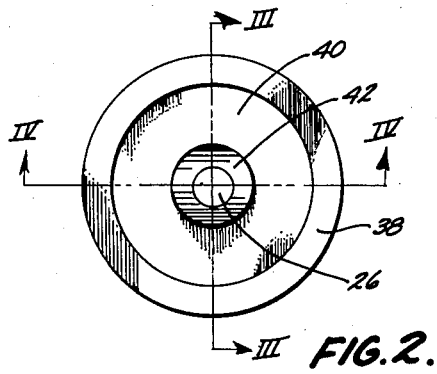
FIG. 2 is an enlarged underside view of the rod seat member of FIG. 1.

Describing now first the embodiment of FIGS. 1 through 6, the environment of the invention is best shown in FIG. 1. The valve tappet generally shown at 10 has a body 12 in which a hollow plunger 14 is reciprocably mounted. The interior of the hollow plunger 14 forms an oil reservoir 16 which is closed off at its upper end by the push rod seat member 18 seated against shoulder 46. The push rod seat 18 has a concavity 20 formed therein which is shaped to receive a hollow push rod 22. The interior cavity 24 of the push rod 22 communicates with an oil passageway 26 formed centrally of the push rod seat 18 through an opening 28.

Figures 5, 6:
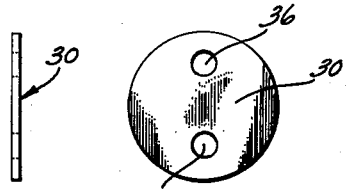
FIG. 5 is a plan view of the metering disc.
FIG. 6 is a vertical section through the metering disc.

The lower end of the passageway 26 is nearly closed off by a metering disc 30 best shown in FIGS. 5 and 6. The metering disc 30 has a pair of apertures 36 formed therein.

Figure 3:
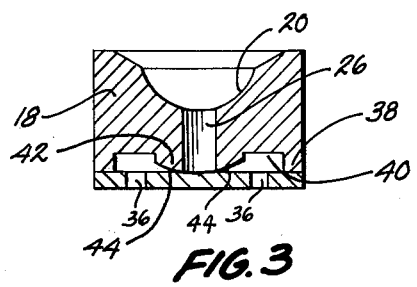
FIG. 3 is a vertical section through the rod seat member, with the vertical dimensions of the metering elements greatly exaggerated for clarity.
Figure 4:
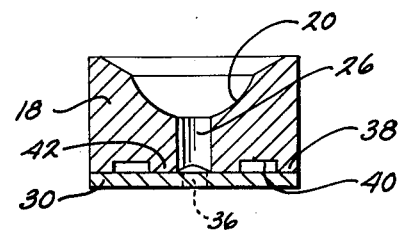
FIG. 4 is a similar vertical section through the rod seat member but displaced 90° from the section of FIG. 3.

As will be best seen from FIGS. 3 and 4, the push rod seat 18 has on its underside an annular rim portion 38 encircling an annular groove 40, which in turn encircles a circular nose portion 42. A comparison of FIGS. 3 and 4, which are sections rotated by 90° from one another will readily show that the bottom surface of the nose portion 42 is cylindrical in shape. Consequently, as best shown in FIG. 4, oil circulating between the groove 40 and the metering disc 30 can penetrate into the passageway 26 by a pair of small lateral openings 44.

In order to keep the openings 44 from clogging with minute dirt or gum particles, it is necessary to provide for rotation of the disc 30 with respect to the nose portion 42. To achieve this, the push rod seat 18 is slip-fitted into the hollow plunger 14. When the tappet is installed in an engine, constant downward pressure is exerted on the push rod seat 18 by the push rod 22. This pressure may typically vary between a minimum of 7 pounds and a considerably higher maximum value in rapid cycles during the operation of the engine. Normal engine vibration and, in many applications, rotation of the tappet body, causes the rod seat member 18 and metering disc 30 to rotate with respect to one another, so that any deposits building up in openings 44 are constantly vibrated and flushed away.

*Modifications*

Figure 7:
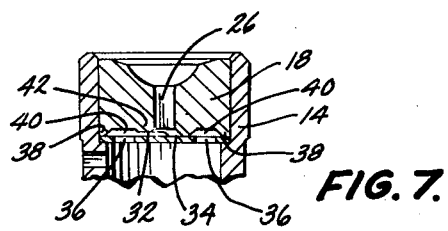
FIG. 7 is a fragmentary section in a plane like that of FIG. 1 but showing a modified embodiment of the invention.
Figure 8:
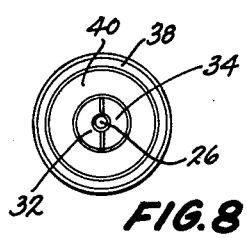
FIG. 8 is an underside view of the seat of FIG. 7.

In the modification shown in FIGS. 7 and 8, the bottom surface of the nose portion 42 is divided on its underside into a channel-defining surface 32 and a disc-contacting surface 34, which are both flat but are offset from one another by a small amount, e.g. one one-thousandth of an inch. In order to avoid bending the disc 30, the lower half 34 of nose portion 42 is level with the rim portion 38. This permits the metering disc 30 to remain flat in operative condition and therefore eliminates any possible vibrational wear of the nose portion 42 by the metering disc 30.

Figure 9:
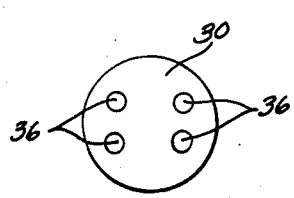
FIG. 9 is a view similar to FIG. 5 but showing another configuration of the metering disc.

FIG. 9 shows a modified version of the metering disc in which additional apertures 36 are provided to increase the oil circulation between the metering disc 30 and the push rod seat 18 so as to improve the flushing action along the surface 32.

Summary

It will be seen that the present invention provides a practical and effective solution to the problem of reducing the manufacturing cost of the oil metering means disclosed in Patent 2,948,270 while increasing their reliability. Obviously, the concept disclosed herein may be carried out in varying ways, and it is therefore to be understood that the invention is not limited by the embodiments described herein, but only by the scope of the following claims.

I claim:

1. A hydraulic tappet comprising: a hollow plunger member having an open end; a push rod seat member disposed at and closing said open end, said seat member having a passageway; and a flat, apertured metering disc between said seat member and the interior of said plunger member, said seat member having a nose portion abutting against said disc, said passageway terminating in said nose portion, and said nose portion being of a shape such that said passageway is only partially obstructed by said disc, said metering disc being held in continuous contact with said nose portion but being capable of rotary movement in its own plane.

2. The device of claim 1, in which said seat member further has an annular rim portion surrounding said nose portion, said plunger has an annular peripheral shoulder, and said metering disc has a peripheral portion held in oil sealing relationship between said rim portion and said shoulder when said tappet is in operative position.

3. The device of claim 2, in which said rim portion of said seat member is an annular shoulder defining an annular groove in said seat member between said shoulder and said nose portion, the apertures in said metering disc being in registry with said groove.

4. Oil flow control means for a valve tappet, comprising: a tappet body including a hollow plunger having an internal shoulder; a push rod seat closing said plunger and having a rim portion biased toward said shoulder; an annular groove formed in said push rod seat inwardly of said rim portion; said push rod seat having a nose portion inwardly of said annular groove; and a flat metering disc having its perimeter interposed between said rim portion and said shoulder, and having apertures formed therein opposite said annular groove; a passageway formed in said nose portion normal to said metering disc; said nose portion being so dimensioned as to touch said metering disc adjacent said passageway and so shaped as to provide, in conjunction with said metering disc, a narrow flow channel between said groove and said passageway.

5. Oil flow control means for a valve tappet, comprising: a tappet body including a hollow plunger having an internal shoulder; a push rod seat closing said plunger and having a rim portion biased toward said shoulder; an annular groove formed in said push rod seat inwardly of said rim portion; said push rod seat having a nose portion inwardly of said annular groove; and a flat metering disc having its perimeter interposed between said rim portion and said shoulder, and having apertures formed therein opposite said annular groove; a passageway formed in said nose portion normal to said metering disc; said nose portion having a cylindrical surface tangential to said metering disc, said passageway opening into said cylindrical surface astraddle the tangent along which said surface touches said metering disc.

6. Oil flow control means for a valve tappet, comprising: a tappet body including a hollow plunger having an internal shoulder; a push rod seat closing said plunger and having a rim portion biased toward said shoulder; an annular groove formed in said push rod seat inwardly of said rim portion; said push rod seat having a nose portion inwardly of said annular groove; and a flat metering disc having its perimeter interposed between said rim portion and said shoulder, and having apertures formed therein opposite said annular groove; a passageway formed in said nose portion normal to said metering disc; said nose portion having a flat surface in contact with said metering disc, and a channel defining surface slightly spaced from said disc, said passageway opening at least partly into said channel defining surface.

7. The device of claim 6, in which said channel defining surface is also flat.

References Cited in the file of this patent

UNITED STATES PATENTS

| | | |
|---|---|---|
| 1,915,867 | Penick | June 27, 1933 |
| 2,405,927 | Tornblom | Aug. 13, 1946 |
| 2,948,270 | Bergmann | Aug. 9, 1960 |